United States Patent [19]
Kurita et al.

[11] Patent Number: 5,021,876
[45] Date of Patent: Jun. 4, 1991

[54] IMAGE PROCESSING APPARATUS WITH REAL-TIME TEXTURE PROCESSING

[75] Inventors: Mitsuru Kurita, Tokyo; Yoshinori Ikeda, Kawasaki; Yasumichi Suzuki, Tokyo; Koichi Katoh, Yokohama; Hiroyuki Ichikawa, Kawasaki; Toshiyuki Kitamura, Kawasaki; Toshihiro Kadowaki, Kawasaki, all of Japan

[73] Assignee: Canon Kabushiki Kaisha, Tokyo, Japan

[21] Appl. No.: 587,172

[22] Filed: Sep. 18, 1990

Related U.S. Application Data

[63] Continuation of Ser. No. 436,205, Nov. 14, 1989, abandoned.

[30] Foreign Application Priority Data

| Nov. 14, 1988 | [JP] | Japan | 63-287093 |
| Nov. 18, 1988 | [JP] | Japan | 63-291564 |
| Feb. 14, 1989 | [JP] | Japan | 1-35349 |

[51] Int. Cl.⁵ .................................. H04N 1/46
[52] U.S. Cl. ..................... 358/75; 358/78; 358/450
[58] Field of Search ................ 358/75, 78, 80, 450

[56] References Cited

U.S. PATENT DOCUMENTS

| 4,403,249 | 9/1983 | Knop | 358/80 |
| 4,513,325 | 4/1985 | Itoh | 358/450 |
| 4,639,791 | 1/1987 | Masaki | 358/300 |
| 4,641,197 | 2/1987 | Miyagi | 358/450 |
| 4,642,699 | 2/1987 | Ohi | 358/450 |
| 4,682,190 | 7/1987 | Ikeda | 346/154 |
| 4,714,940 | 12/1987 | Inoue et al. | 355/3 R |
| 4,731,672 | 3/1988 | Sugishima et al. | 358/296 |
| 4,916,489 | 4/1990 | Takeda et al. | 355/210 |

Primary Examiner—Howard W. Britton
Attorney, Agent, or Firm—Fitzpatrick, Cella, Harper & Scinto

[57] ABSTRACT

There is provided an image processing apparatus for modulating a concentration of input image data, comprising: an inputting device to input image data; a RAM to store first image data input by the inputting device; a processing unit to execute a modulating process to at least one area such as a non-rectangular area in second image data input by the inputting device by using the first image data stored in the RAM; and a detector to detect a predetermined color of the second image data. The area is specified by the color detected by the detector. The inputting device includes a CCD for reading an original and generating RGB color component signals. With this apparatus, a texture process is executed to at least one non-rectangular area and the result can be output in a real-time manner.

73 Claims, 18 Drawing Sheets

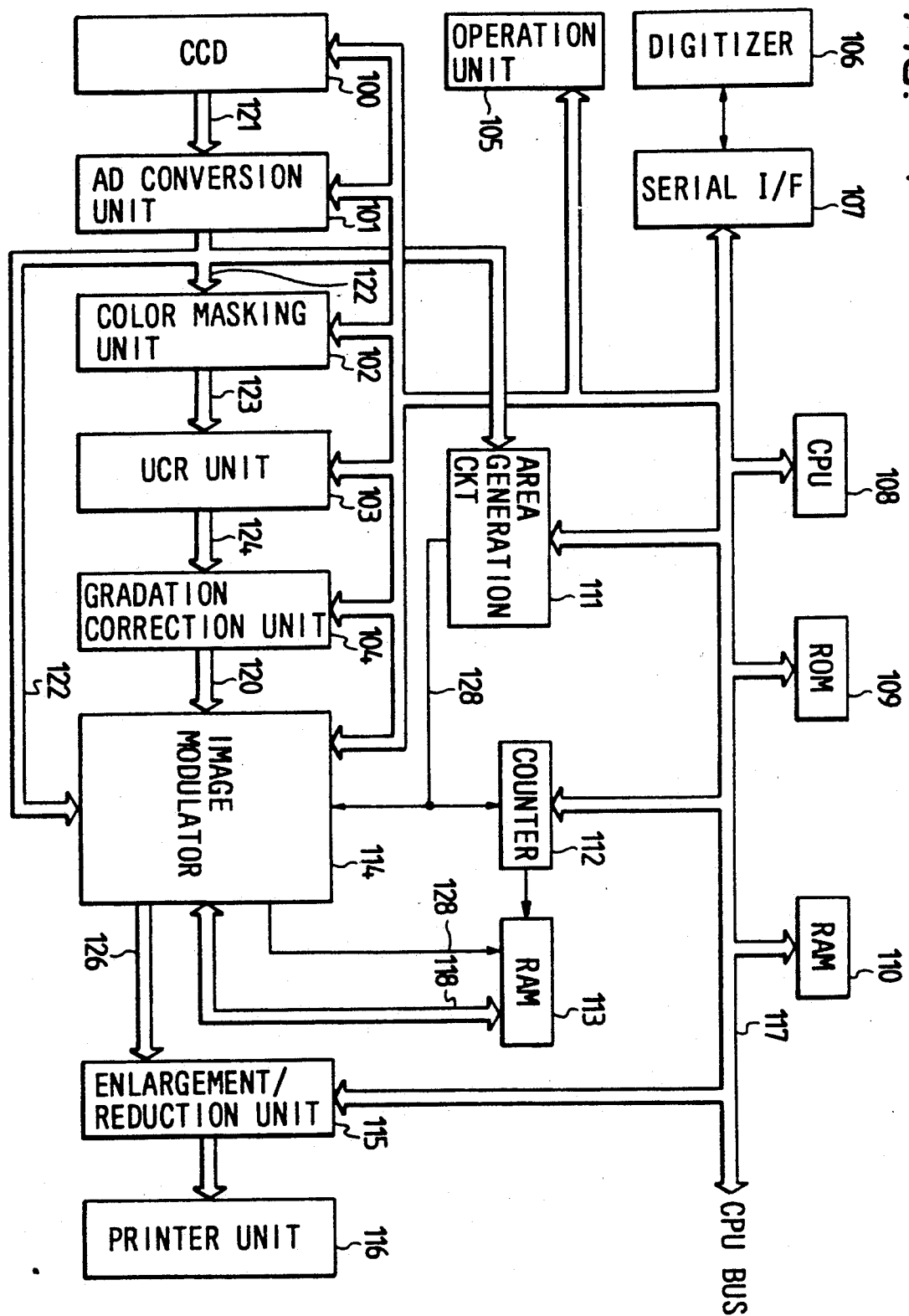

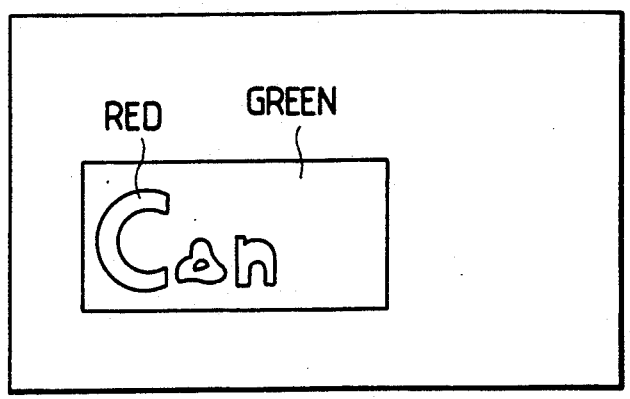
FIG. 6A
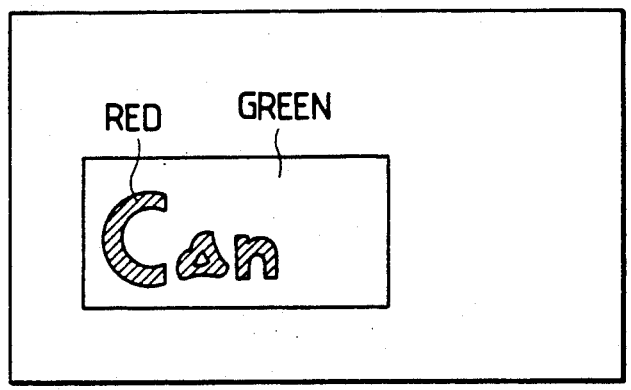
FIG. 6B
FIG. 7A
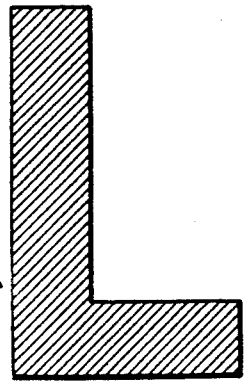
FIG. 7B
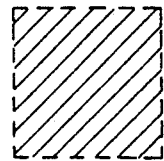
FIG. 7C
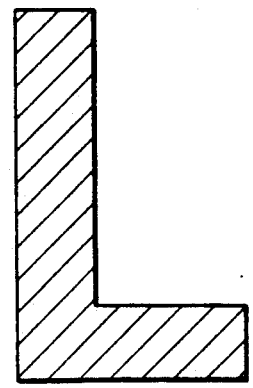

| $(x_{i-1}, y_{i-1})$ | $(x_i, y_{i-1})$ | $(x_{i+1}, y_{i-1})$ |
| --- | --- | --- |
| $(x_{i-1}, y_i)$ | $(x_i, y_i)$ | $(x_{i+1}, y_i)$ |
| $(x_{i-1}, y_{i+1})$ | $(x_i, y_{i+1})$ | $(x_{i+1}, y_{i+1})$ |

WHERE $\begin{cases} x_i \leq 0 \text{ ------ } 512 + x_i \\ 0 < x_i < 512 \text{ --- } x_i \\ x_i \geq 512 \text{ ----- } x_i - 512 \end{cases}$ $\begin{cases} y_i \leq 0 \text{ ------ } 512 + y_i \\ 0 < y_i < 512 \text{ --- } y_i \\ y_i \geq 512 \text{ ----- } y_i - 512 \end{cases}$

| (512,512) | (1,512) | (2,512) |
| --- | --- | --- |
| (512,1) | (1,1) | (2,1) |
| (512,2) | (1,2) | (2,2) |

VALUE OF CENTRAL PIXEL e
$= \frac{1}{9}(a+b+c+d+e+f+g+h+i)$

FIG. 12-3
FIG. 12-4
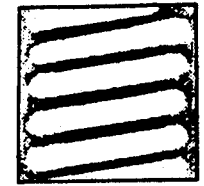
FIG. 13-1
FIG. 13-2
FIG. 14
| a | b | c |
|---|---|---|
| d | e | f |
| g | h | i |
VALUE OF CENTRAL PIXEL e
=MAX(a. b. c. d. e. f. g. h. i)

PATTERN MEMORY

PATTERN MEMORY

PATTERN MEMORY

READ PATTERN

IMAGE PROCESSING APPARATUS WITH REAL-TIME TEXTURE PROCESSING

This application is a continuation of application Ser. No. 07/436,205, filed Nov. 14, 1989, now abandoned.

BACKGROUND OF THE INVENTION

1. Field of the Invention

The present invention relates to an image processing apparatus for concentration modulating input image data.

2. Related Background Art

Hitherto, an apparatus which can execute a process (hereinafter, referred to as a texture process) for concentration modulating image data by using arbitrary pattern data has been limited to a relatively large scale computer. The texture process will now be briefly described. For instance, the texture process denotes that an input image as shown in FIG. 7A is concentration modulated by using pattern data as shown in FIG. 7B, so that an output image as shown in FIG. 7C is obtained. Assuming that the texture pattern of FIG. 7B is a pattern of a cloth design, for example, the cloth pattern can be synthesized to the area in the L-shaped character of FIG. 7A.

In an image processing apparatus for outputting an image from an image input in a real-time manner, the apparatus which can execute such a texture process does not exist.

On the other hand, hitherto, in the case of executing the texture process on a plurality of areas, the process must be sequentially executed for every area, which is troublesome. Therefore, in the case of synthesizing the same texture pattern with each of a plurality of areas, it takes time in proportion to the number of areas.

In addition, in the case of executing the texture process on a non-rectangular area instead of a rectangular area, a mask must be produced to designate such an area, which is very complicated.

Further, in the case of variably magnifying a texture pattern and executing concentration modulation thereof with the input image data, after the variably magnifying process is executed on the texture pattern every process, the texture process must be performed, which is troublesome.

On the other hand, for instance, an apparatus of a construction shown in FIG. 1 is considered as a method of realizing the texture process executed on an input image in a real-time manner. That is, according to this method, a pattern image for the texture process is read and in advance, and when an original image which is to be subjected to the texture process is read, the stored pattern image is read out and calculated by an image modulator and the concentration is modulated.

However, in such an apparatus, since there is a limitation in the capacity of a memory unit to store the pattern image for the texture process, if the pattern image to be processed is smaller than the original image data to be processed, the pattern image must be repetitively used.

In the case of repetitively using the pattern image as mentioned above, no problem occurs for an image such that the patterns are relatively continuous at the right-/left and upper/lower joint surfaces of the pattern image. However, in many cases, since the patterns at the joint surfaces are discontinuous, there is a drawback that the image after completion of the texture process suddenly changes at the joint surfaces of the pattern and an unnatural line of the concentration difference appears in the image. For instance, FIG. 16A shows a finite size pattern. FIG. 16B shows concentration difference lines which are generated when the texture process of the repetitive pattern was executed to an area larger than the size of the finite size pattern of FIG. 16A.

Such a drawback inevitably occurs in the image process for concentration modulating an image in accordance with a certain pattern.

SUMMARY OF THE INVENTION

The present invention is made in consideration of the above conventional technique and it is the first object of the invention to provide an image processing apparatus which can execute the texture process in a real-time manner.

To accomplish the above object, according to a first aspect of the present invention, there is provided an invention in which by providing means for producing at least one area signal, particularly, a non-rectangular area signal, a texture process is executed on at least one area and the result can be output in a real-time manner.

The second object of the invention is to provide an image processing apparatus which can execute a variety of texture processes.

To accomplish the second object, according to a second aspect of the present invention, there is provided an invention in which by providing means for storing a modulation pattern and means for controlling addresses of a memory to store the modulation pattern, variable-magnification processes which are different in the horizontal and vertical directions are executed independently of image data to be modulated, texture processes are executed, and the result can be output in a real-time manner.

The third object of the invention is to provide an image processing apparatus which can prevent a deterioration in picture quality when a texture process is executed.

To accomplish the third aspect of the present object, the third invention comprises: input means for inputting first image data; memory means for storing the first image data; means for executing a proper process to the first image data; input means for inputting second image data; and means for modulating a concentration of the second image data by an output from the means for executing the proper process.

The above and other objects and features of the present invention will become more fully apparent from the following detailed description of the preferred embodiments with reference to the accompanying drawings.

BRIEF DESCRIPTION OF THE DRAWINGS

FIG. 1 is a whole block diagram of an image processing apparatus of the first embodiment of the present invention;

FIGS. 6A and 6B are diagrams showing a practical example of a texture process in the second embodiment of the invention;

FIGS. 7A to 7C are diagrams showing the relation between the texture and the modulation pattern;

FIGS. 9-1 and 9-2 are block diagrams of image modulators;

FIGS. 10-1 and 10-2 are flowcharts for the operation of the image processing apparatus of the third embodiment of the invention;

FIG. 11-1 is a constructional diagram of an RAM for a texture pattern;

FIG. 11-2 is a diagram showing a method of calculating coordinates for a filtering process;

FIG. 11-3 is a diagram showing a practical example of the calculation of the coordinates for the filtering process;

FIG. 12-1 is a diagram showing a range which is subjected to the filtering process;

FIG. 12-2 is a diagram showing an example of a smoothing filter which is used in the filtering process;

FIG. 12-3 is a diagram showing a texture pattern before the filtering process is executed;

FIG. 12-4 is a diagram showing the texture pattern after completion of the filtering process;

FIG. 13-1 is a diagram showing the case where the texture pattern before the filtering process was repeated;

FIG. 13-2 is a diagram showing the case where the texture pattern after completion of the filtering process was repeated;

FIG. 14 is a diagram showing a filter matrix;

DESCRIPTION OF THE PREFERRED EMBODIMENTS

(Embodiment 1)

Figures 1, 9:
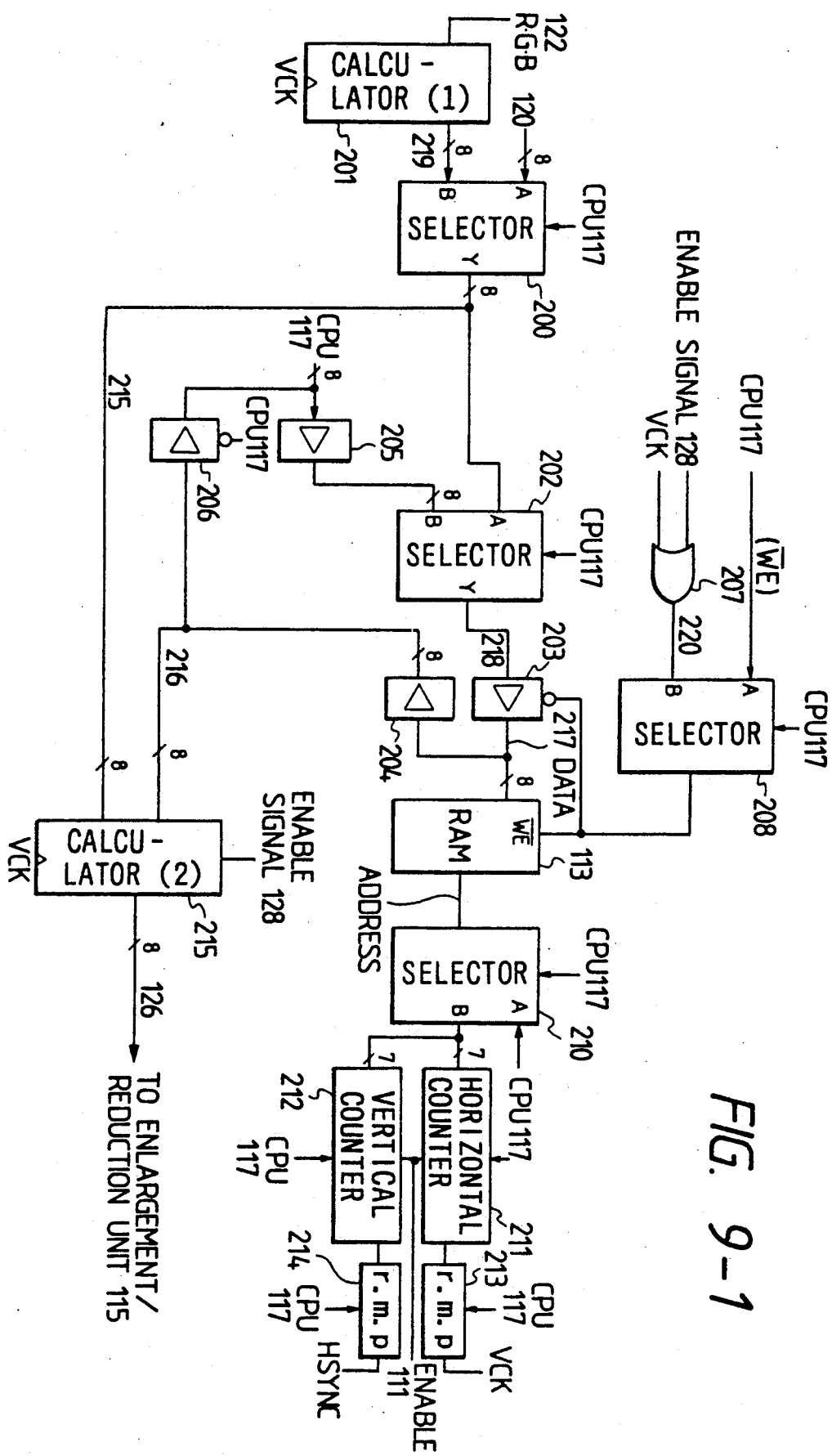
Figures 2, 9:
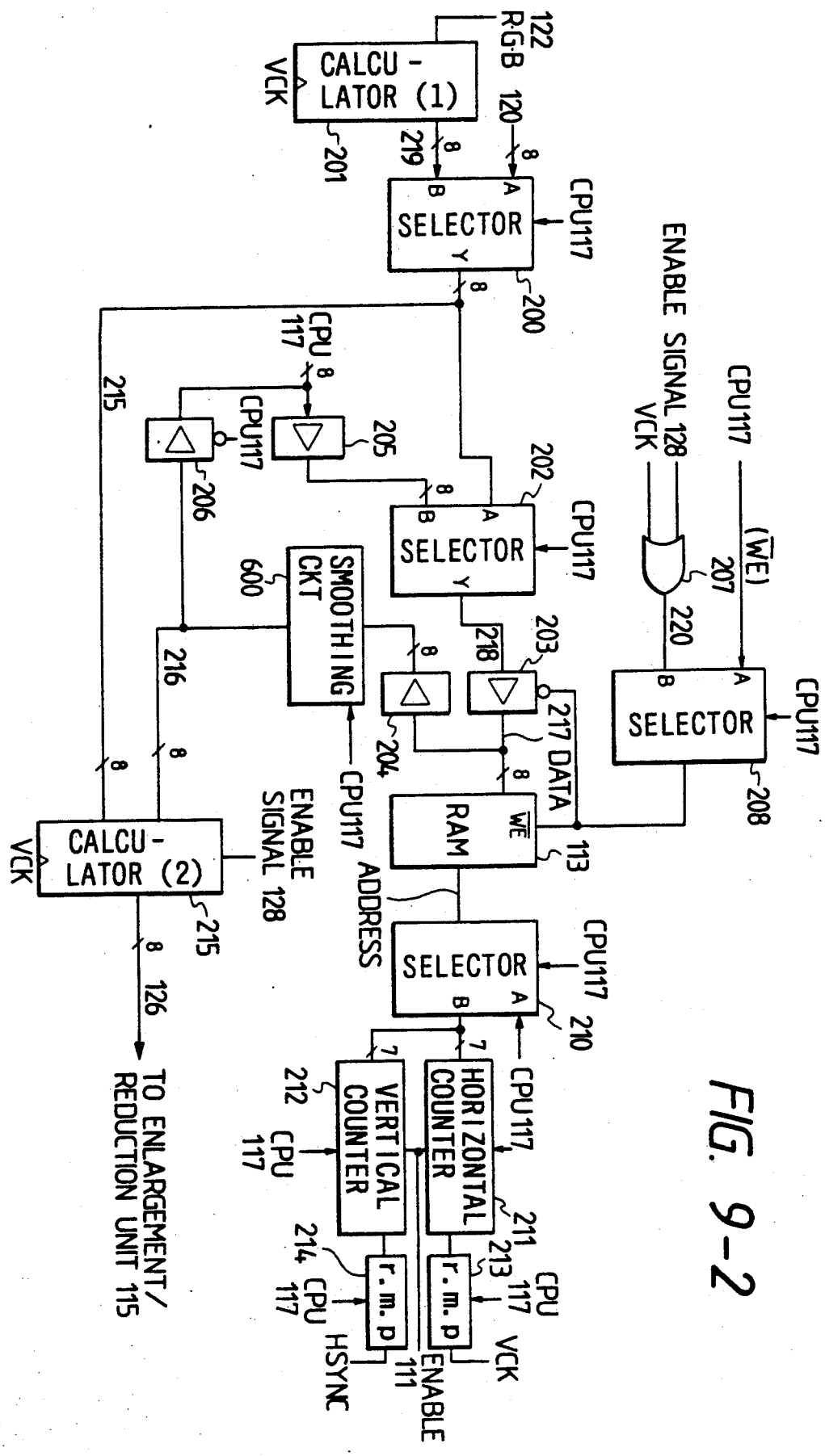

FIG. 1 is a block diagram, including a texture process portion of a color copying apparatus as an image processing apparatus of the embodiment. The apparatus of the embodiment comprises: a CPU 108 for processing and calculating which is connected to a CPU bus 117; a ROM 109 in which programs for the texture process and the like are previously stored; a RAM 110 for auxiliary storage which is used as a work area; a CCD 100 to read image data; an A/D conversion unit 101 for converting an analog signal into a digital signal; a color masking unit 102; an undercolor removing unit or undercolor removal unit (hereinafter, simply referred to as an UCR unit) 103 for removing the undercolor from output data 123 of the color masking unit 102; a gradation correction unit 104 on execute the gamma conversion to image data 124; an operation unit 105 to execute various inputs; an image modulator 114 to execute the texture process on the basis of image data 120 and data from RAM 113; an area generation circuit 111 to generate an area signal (particularly, the area signal is used as an enable signal of a counter 112 and an enable signal of the texture process in image modulator 114); an enlargement/reduction unit 115 to execute an enlarging/reducing process in the horizontal direction on image data 126; and a printer unit 116 to output a final hard copy. A digitizer 106 is connected to the apparatus through a serial I/F 107.

A color laser beam printer is used as a printer unit·116 in the example. The printer unit 116 sequentially develops the colors of Y (yellow), M (magenta), C (cyan), and K (black) and obtains a full-color image output.

Figure 3:
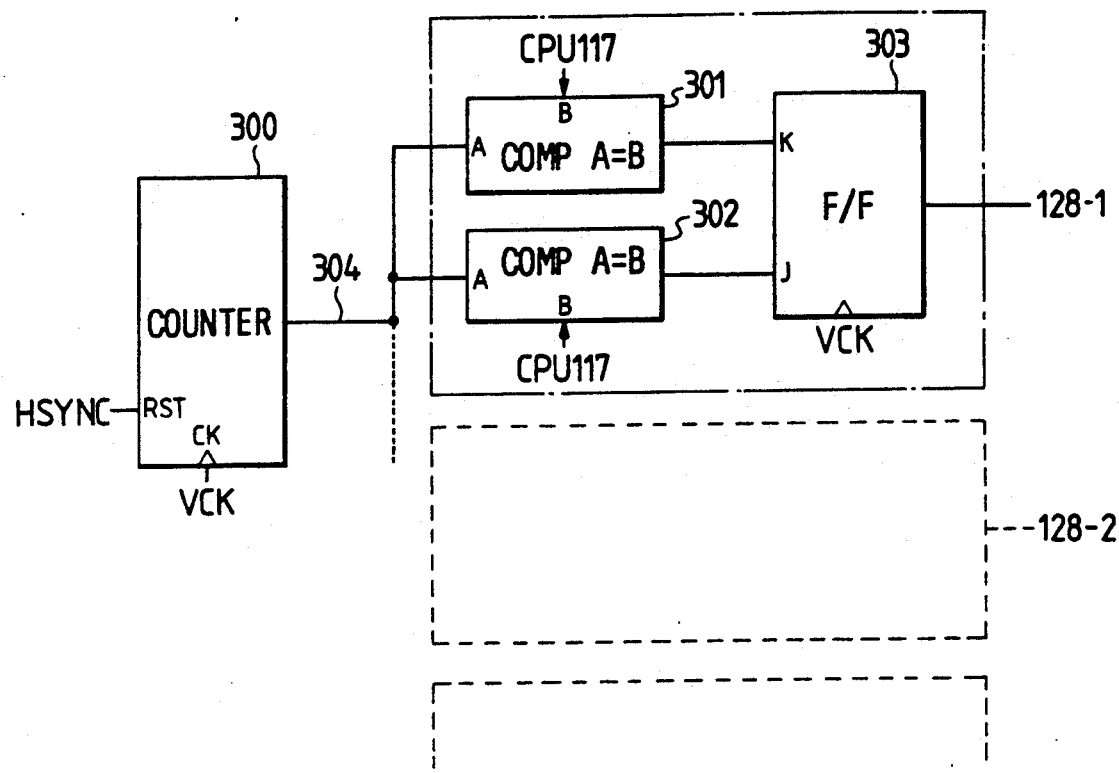
FIG. 3 is an explanatory diagram of an area generating circuit 111.

FIG. 3 is an explanatory diagram of the area generation circuit 111. The area designation circuit 111 comprises: a counter 300 which is counted up by the input of an image clock VCK and is reset by the input of a horizontal sync signal HSYNC and outputs a count signal 304; comparators 301 and 302 to indicate an active start point and an active end point of the area signal on the basis of data which is input from the digitizer 106; and a JK flip-flop (JK F/F) 303 which executes toggling operation on the basis of outputs of the two comparators 301 and 302 and generates an area signal, that is, an enable signal 128-1 of the texture process. In the case of using a plurality of area signals 128-1, 128-2, . . . , it is sufficient to provide the plural blocks shown by broken lines equal in number to the areas.

Figure 2:
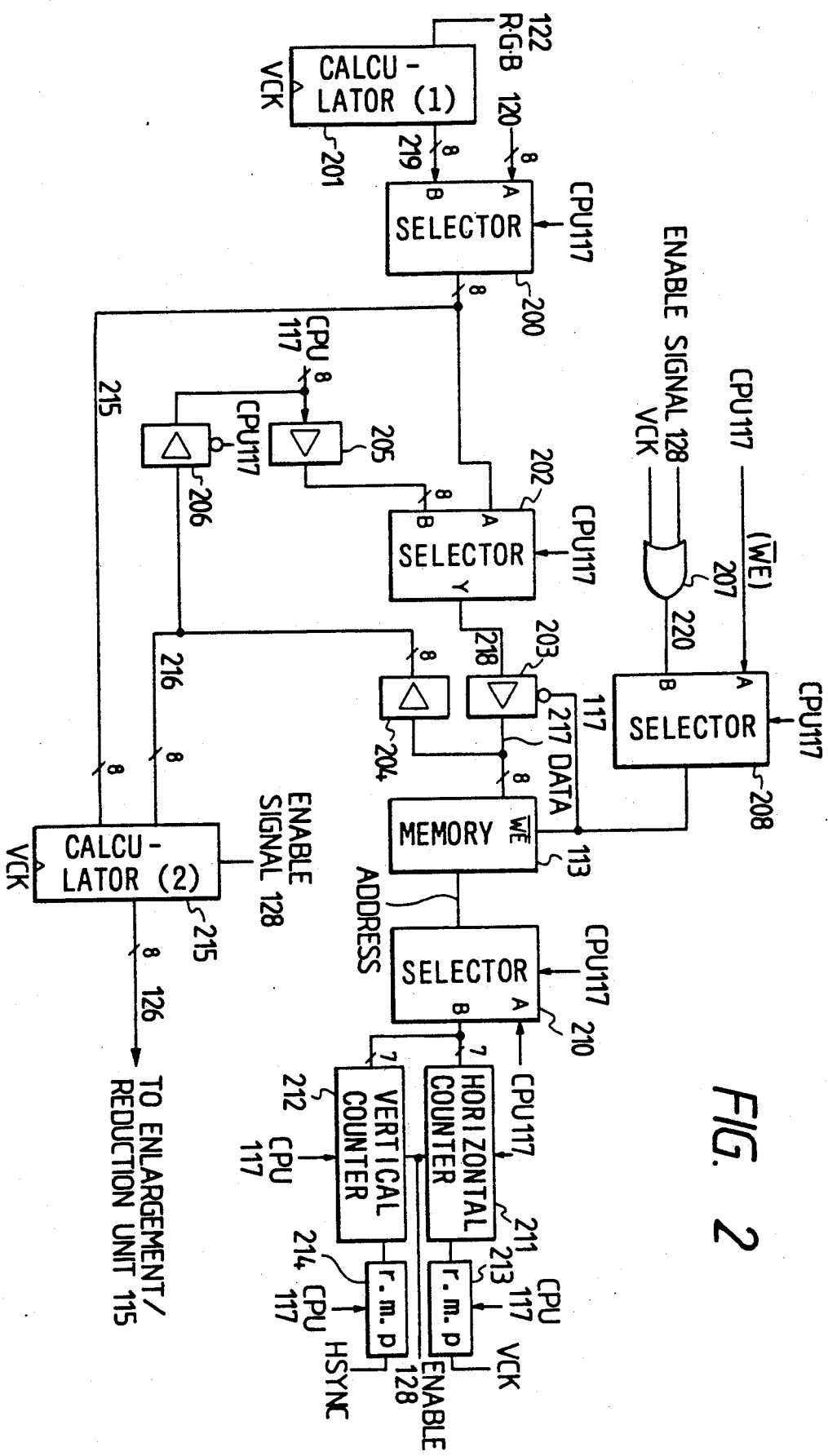
FIG. 2 is a diagram for explaining a texture processing circuit.

FIG. 2 is a diagram for explaining a texture processing circuit as a characteristic section of the invention. Explanation will now be made individually hereinbelow with respect to a writing unit to write modulation data (texture pattern) 218 into the RAM 113 and a calculating unit (texture processing unit) of data 216 from the RAM 113 and image data 215 which is to be subjected to the texture process.

(Writing unit to write data into the RAM 113)

1. Writing of modulation data (texture pattern) from a CCD

A calculator (1) 201 comprises: luminance to concentration converters for receiving input signals of R (red), G (green), and B (blue) and outputting signals of Y (yellow), M (magenta), and C (cyan); and a YMC mean value circuit. For RGB input signals 122, $(Y+M+C)/3$, that is, concentration data 219 of eight bits, is obtained. The concentration data 219 is input to the B side of a selector 200. On the other hand, data 120 of eight bits is input to the A side of the selector 200 through the CPU bus 117. This 8-bit data is the video data and is the read image data which is not transmitted through the calculator (1) 201. When data is written into the memory, the selector 200 selects the concentration data on the B side in response to an instruction of the CPU 108. Then, a selector 202 selects its A side.

On the other hand, an OR circuit 207 calculates the OR of the enable signal 128 and the VCK and outputs the result to the B input of selector 208, which selects its B side by an instruction of the CPU 108. To write the modulation pattern into the memory 113, a signal 220 is input as an enable signal to a $\overline{\text{WE}}$ input terminal of the memory 113 and to a driver 203.

A memory address signal is produced by a vertical counter 212 which is counted up synchronously with the horizontal sync signal HSYNC and a horizontal counter 211 which is counted up synchronously with the image clock VCK. A selector 210 selects its B side (output from counters 211 and 212) and the selected memory address signal is input to an address in the memory 113.

As mentioned above, the concentration pattern of the input image is written into the memory 113. In general, for such a pattern, the position of an original is designated by the digitizer 106 and the CCD 100 then the pattern of the designated position is written into the memory 113.

2. Writing of modulation data (texture pattern) from the CPU

In the case where the modulation data from the CPU 108 is written into the memory 113, the selector 202 selects the B side receive as input the CPU data. On the other hand, the selector 208 selects the $\overline{\text{WE}}$ signal of the CPU on the A side. The $\overline{\text{WE}}$ signal is input as a $\overline{\text{WE}}$ signal to the memory 113 and as an enable signal to the driver 203. For the memory address, the CPU address signal on the A side is selected by the selector 210 and is input to an address in the memory 113. In this manner, by switching the addresses in the case where the pattern data from the reader is stored into the memory 113 and the case where the pattern data from the CPU 108 is stored, the pattern data even from any input can be stored. As mentioned above, an arbitrary concentration pattern is written into the memory 113.

(Calculating unit of data 216 of the RAM 113 and image data 215)

The above calculation is realized by a calculator (2) 215. The calculator (2) comprises a multiplier. The calculation using the data 216 and 215 is executed only in the portion where the enable signal 128 generated by the area generation circuit 111 is active, so that the texture process is executed. When the enable signal 218 is in the disable state, the data 215 is set to the through state, so that the image data 126 of eight bits which is not subjected to the texture process is output.

Figure 4A:
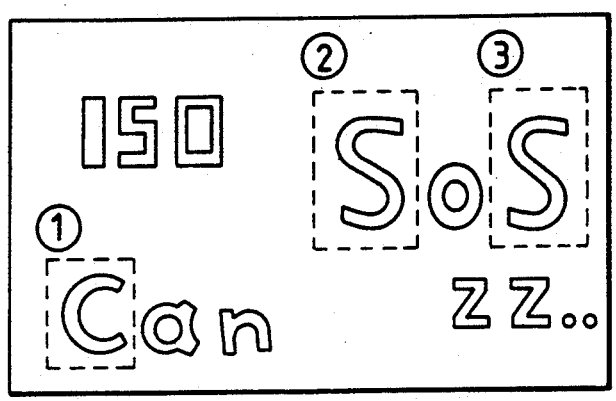
FIGS. 4A and 4B are diagrams showing a practical example of a texture process.
Figure 4B:
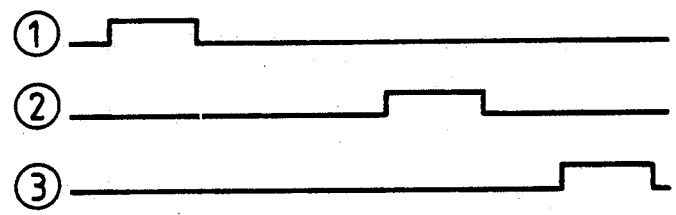

When the texture process is executed on the broken line area       of an image as shown in FIG. 4A, the OR of the area signals of    to    is input as an enable signal, so that an output image as shown in FIG. 4B can be obtained. (It is here assumed that the modulation pattern is as shown in FIG. 7B.)

As mentioned above, by calculating the OR of a plurality of area signals, the process to synthesize the same texture pattern can be executed by merely the adding a procedure to designate a plurality of areas.

(Calculating unit of data 216 of the RAM 113 and image data 215)

The calculation to synthesize the data (texture pattern data) 216 of the RAM 113 and the image data 221 is realized by the calculator (2) 215. The calculator (2) comprises a multiplier. The calculation of the data 216 of the calculator and the data 215 is executed in only the portion where the enable signal 218 to control whether the texture process is executed or not is active. When the signal 218 is in the disable state, the data 215 is set to the through state.

The input image data 215 is the data 120 on the A side which is selected by the selector 200, that is, the video data. Another input data 216 is the texture pattern data which is output from the memory 113. In a manner similar to the writing mode, when the data from the memory 113 is read out as well, in the case where pattern data 219 from the CCD has been stored, the address control is executed by using the horizontal counter 211 and vertical counter 212 on the B side of the selector 210. When the pattern data from the CPU 108 has been stored, the CPU address on the A side of the selector 210 is used.

A method of variably magnifying the modulation data (texture pattern data) independently of the input image data will now be described.

(Reduction)

The reducing process is executed when image data 217 is written into the memory 113. Data are set into two r.m.p.'s (rate multipliers) 213 and 214 by the CPU 108 so that the image clocks VCK are thinned out by the r.m.p. 213 and the horizontal sync signals HSYNC are thinned out by the r.m.p. 214. Due to this, the counting-up speeds of the horizontal counter 211 and vertical counter 212 become slow, so that the reduced data is written into the memory 113. When the calculation of the data 216 of the RAM 113 and the image data 215 is executed (when the texture process is performed), data are set into the r.m.p.'s 213 and 214 from the CPU 108 so that the VCK and HSYNC are not thinned out, respectively.

(Enlargement)

On the contrary, when image data is written into the memory 113, data are respectively set into the r.m.p.'s 213 and 214 by the CPU 108 so that the clocks which are not thinned out are set into the two counters.

When the calculation of the data 216 of the RAM 113 and the image data 215 is executed (when the texture process is performed), data are respectively set into the two r.m.p.'s so that the VCK and HSYNC are thinned out. Due to this, the counting-up speeds of the two address counters become slow, so that the texture pattern is modulated in an enlarged form.

Although the same enlarging/reducing processes in the horizontal and vertical directions have been executed in the above embodiment for simplicity of explanation, since an r.m.p. is independently provided for each process, by changing the data which are set into the r.m.p. 213 and 214, it is possible to independently variably magnify in the horizontal and vertical directions in a manner such as to enlarge in only the horizontal direction and to reduce in only the vertical direction, or to reduce in the horizontal direction and to enlarge in only the vertical direction, or the like.

(Repetitive texture)

By repeating the counting operations until certain values of the horizontal counter 211 and vertical counter 212, the same pattern is repeated and the texture process can be executed.

On the other hand, a fineness of the repetitive pattern can be arbitrarily determined by means of the above enlarging and reducing processes.

(Embodiment 2)

The fundamental construction is similar to FIG. 1. The point of difference relates to a construction of the area generation circuit 111. In this embodiment, the area generation circuit 111 comprises the circuits shown in FIGS. 3 and 5.

Figure 5:
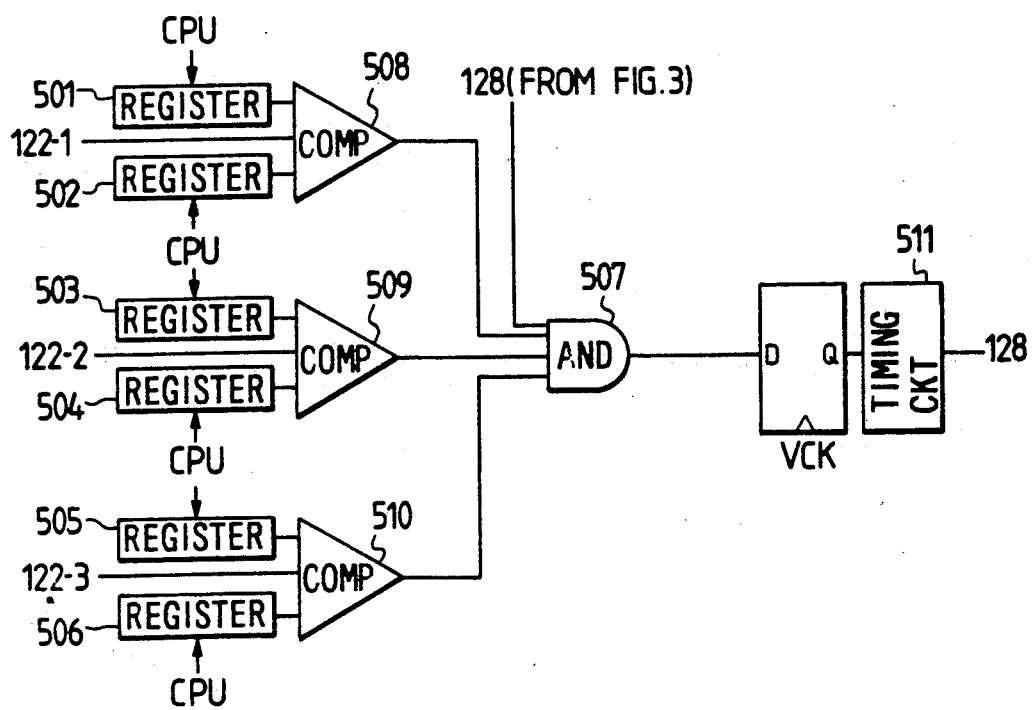
FIG. 5 is an explanatory diagram of the area generating circuit 111 in the second embodiment of the invention.

FIG. 5 will now be described. The area generation circuit 111 outputs a "1" signal from an AND gate 507 when the area signal generated from the circuit of FIG. 3 is set to 1 and when color separation data R (122-1), G (122-2), and B (122-3) of the input image data lie within a predetermined luminance range which has been preset by the CPU 108. Reference numeral 511 denotes a timing circuit which is provided to synchronize the enable signal 128. With the above construction, from an original as shown in FIG. 6A such that red characters are drawn on a green background, an output image in which the texture process has been executed on only the red character portion as shown in FIG. 6B can be obtained. A modulation pattern as shown in FIG. 7B is used here.

By providing the circuit shown in FIG. 5, the non-rectangular texture process can be executed without using a memory to designate an area although it is difficult to adjust the timing.

As described above, according to the apparatus of this embodiment, the texture process can be easily executed on at least one area, particularly, a non-rectangular area in a real-time manner. The apparatus can be widely applied to the design field.

On the other hand, since the modulation pattern can be variably magnified independently of the image data to be modulated, the image data can be easily modulated by the variably magnified modulation pattern in a real-time manner. This provides the advantage that the apparatus can be widely applied to the design field.

(Embodiment 3)

According to the third embodiment of the invention which will be explained hereinlater, by executing a filtering process on an area near the outer frame portion of the pattern image for the texture process, particularly, since the memory unit to store the pattern image has a limited size, in the case where the pattern image must be continuously used or the like, any discontinuity at the joint surfaces of the images in the right/left and upper/lower positions is weakened, thereby enabling the image process to be more continuously executed.

Figure 8:
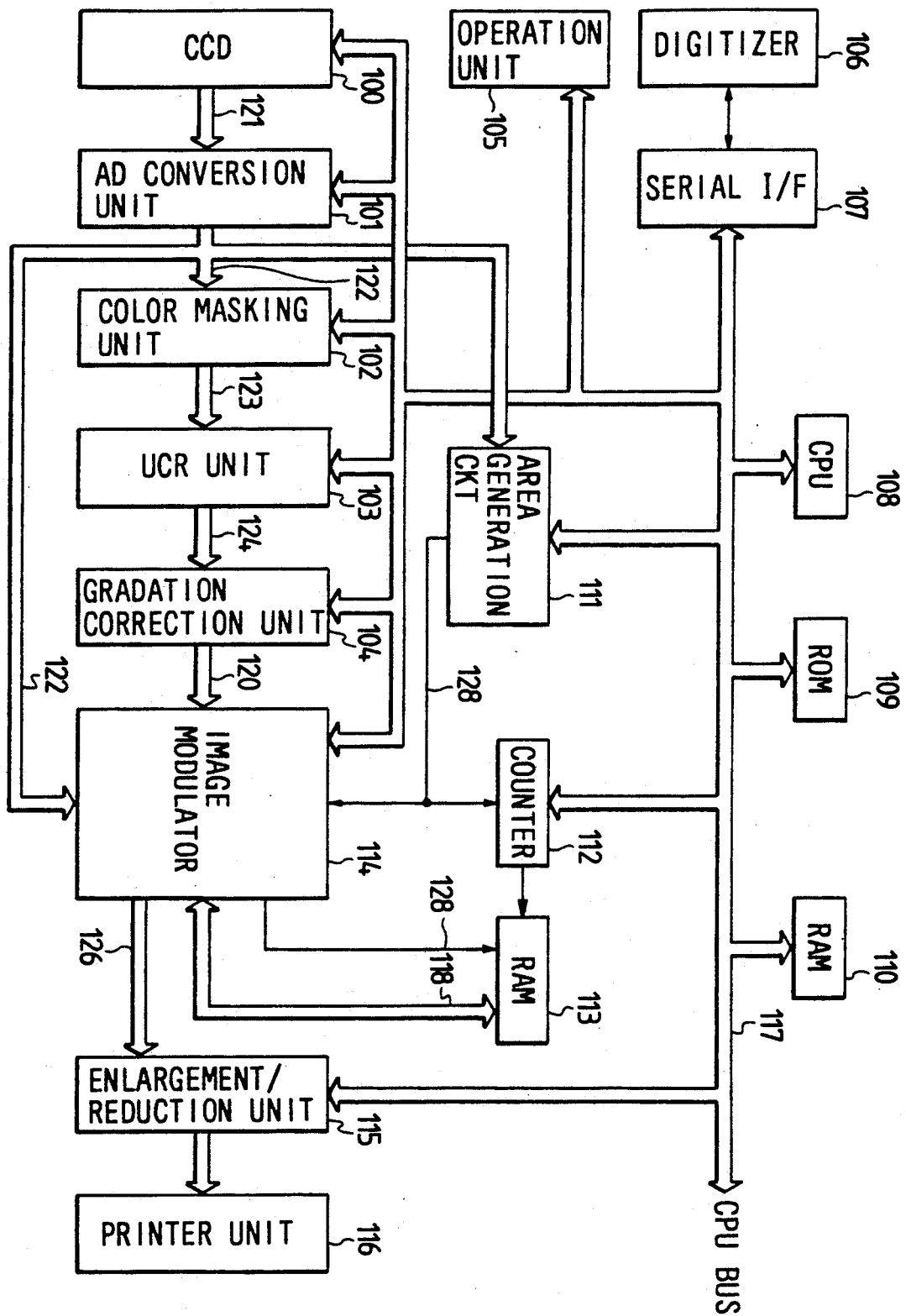
FIG. 8 is a whole block diagram of an image processing apparatus in the third embodiment of the invention.

FIG. 8 is a block diagram including the texture process in the image processing apparatus of the third preferred embodiment of the invention. The fundamental construction of the image processing apparatus in the embodiment is also similar to that in FIG. 1. Therefore, the description of each section is omitted.

FIG. 9-1 is a diagram for explaininq a texture processing circuit. Since the construction of FIG. 9-1 is also similar to FIG. 2, its description is omitted.

The image processing apparatus using the invention includes the operation unit (105 in FIG. 8) having: means (key input means) for selecting the texture mode; and means (key input means) for making the effect of the filtering process of the invention operative or inoperative in the texture process. Each means can set, check, and change. When the texture mode is selected by the mode selecting key, the operating mode is set to the texture processing mode from the ordinary processing mode.

The operation of this embodiment of the invention will now be described herein below.

Figures 1, 10:
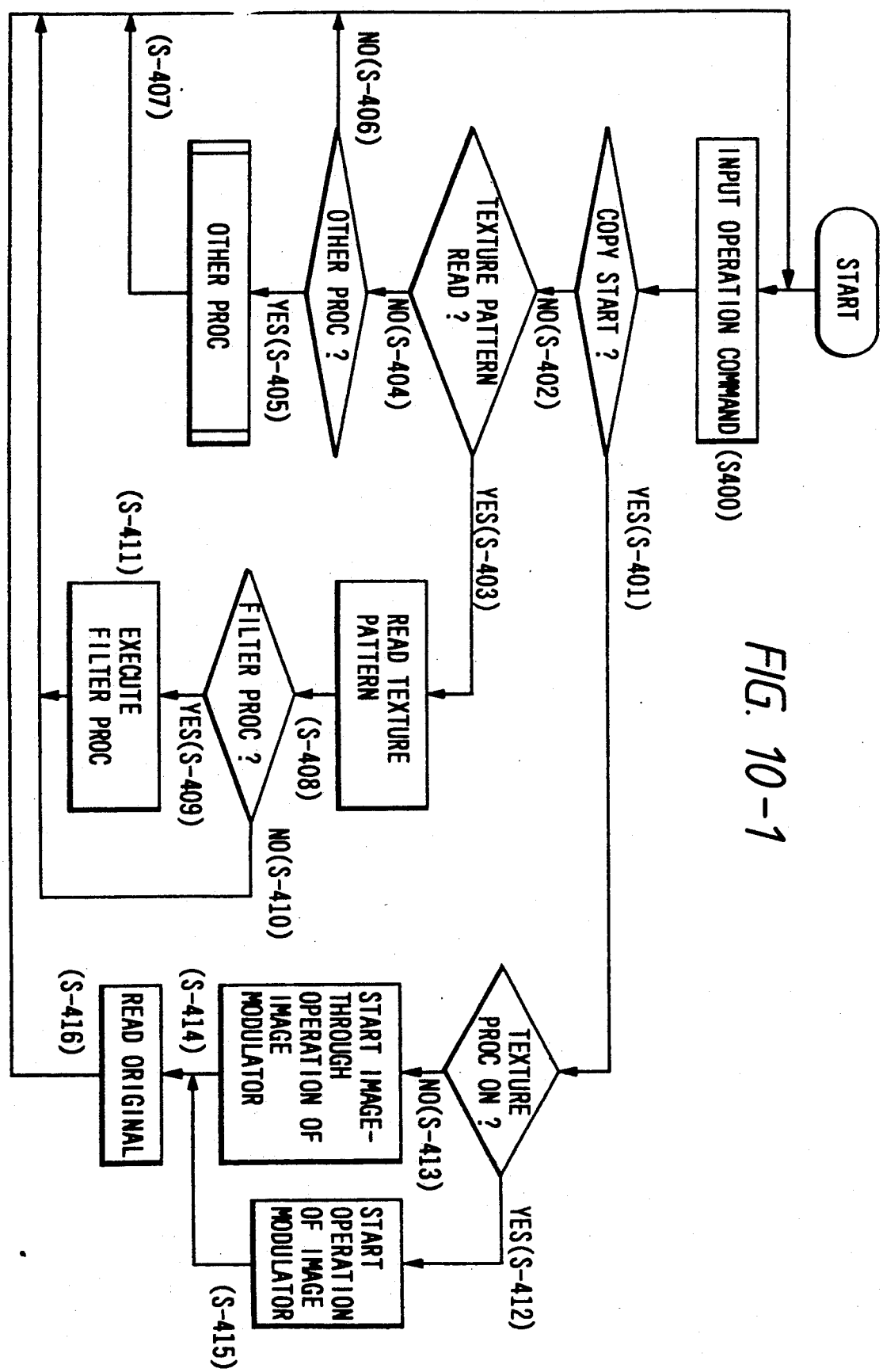
Figures 2, 10:
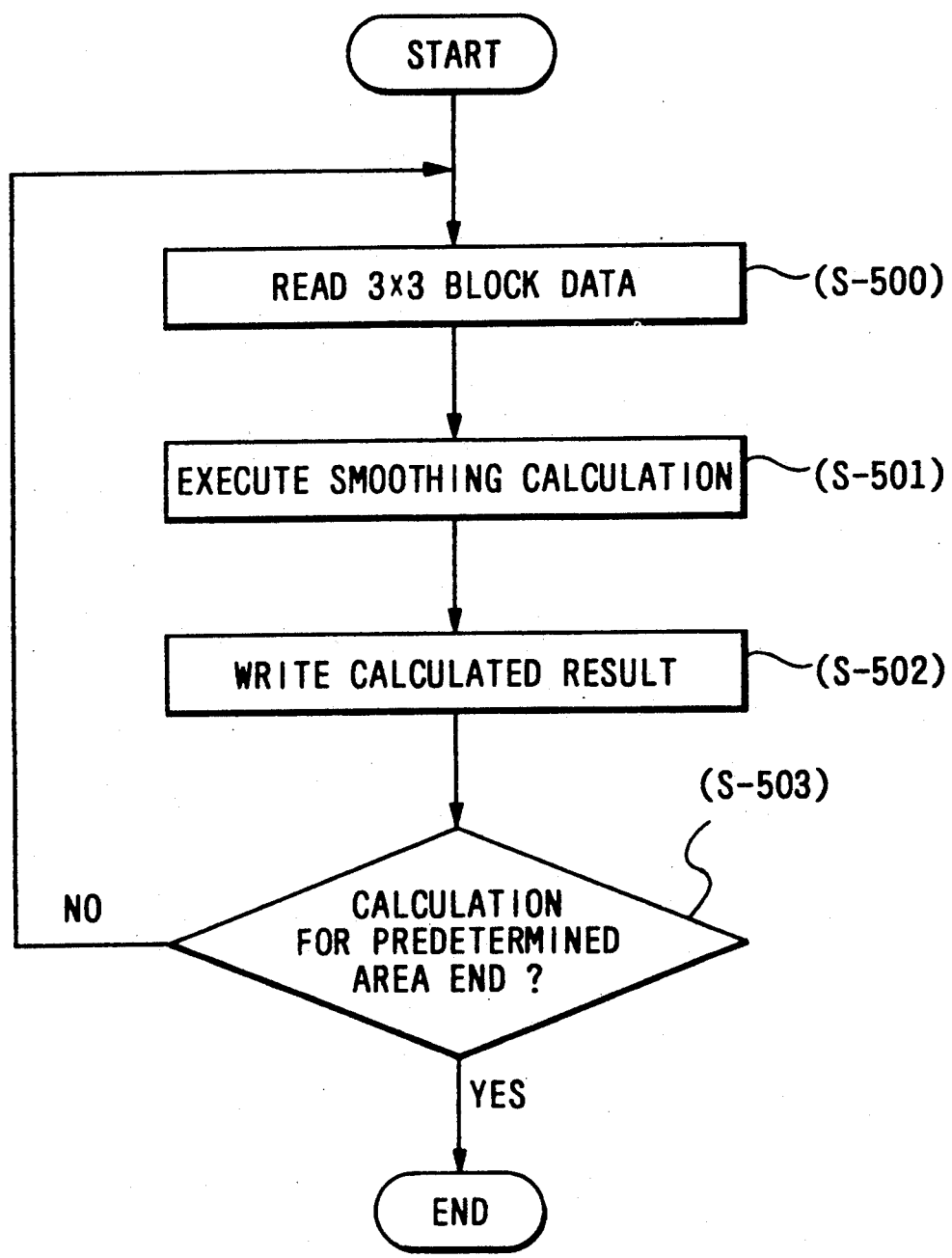

FIG. 10-1 is a flowchart showing an outline of the operation of the apparatus.

First, an operation command is input from the operation unit 105 (step S-400). A check is made to see if the operation command is a copy start command or not. If it is not the copy start command, a check is made to see if the operation command is a texture pattern reading command or not (S-402). If the operation command is the texture pattern reading command (S-403), an original is scanned and the image data obtained is stored in the texture pattern RAM 113 (S-408). On the other hand, if the operating command is not the reading command, a check is made to see if the operating command indicates to execute an other process or not (S-405). If YES, the other process is executed (S-407). When the reading operation is finished, if the execution of the filtering process has not been set (S-410), the apparatus again waits for the input of the operation command (S-400). If the execution of the filtering process has been set (S-409), the filtering process as will be explained hereinafter is performed.

Figures 1, 2, 12:
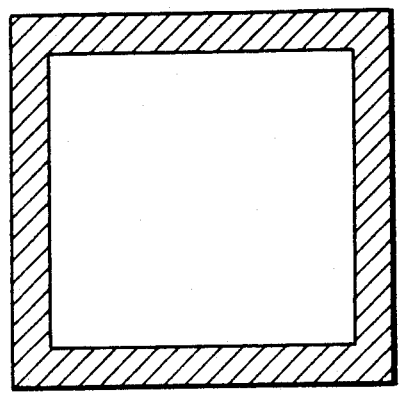

A general filter of an average in a block as shown in FIG. 12-2 is used as a smoothing filter.

Figures 1, 2, 3, 11:
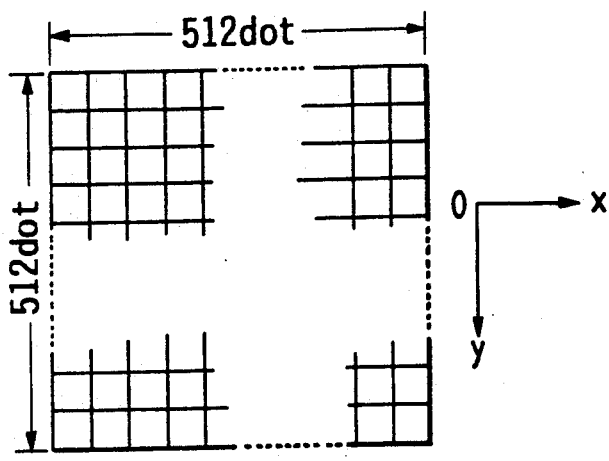

For instance, it is now assumed that the size of RAM 113 for the texture pattern is set to 512 dots × 512 dots as shown in FIG. 11-1.

When executing the filtering process on the contents of the RAM 113 using a matrix of 3×3, the address calculations of the memory are as shown in FIG. 11-2.

FIG. 11-2 shows a matrix of 3×3 indicative of the addresses in the memory.

If all of a total of nine pixels (3×3) which are used in the filtering process lie within an area of 512 dots × 512 dots, the filtering process can be directly executed. However, in the case of filtering the outer peripheral portion of the texture pattern, some of the nine pixels are out of the area of 512 dots × 512 dots. Therefore, in such a case, the address calculations are executed by setting as follows with respect to the x and y directions, respectively, $$\begin{cases} \text{When } x_i \leq 0, & 512 + x_i \\ \text{When } x_i \geq 512, & x_i - 512 \end{cases}$$

$$\begin{cases} \text{When } y_i \leq 0, & 512 + y_i \\ \text{When } y_i \geq 512, & y_i - 512 \end{cases}$$

Due to this, unnecessary lines among the repetitive patterns in the repetition of the texture pattern as shown in FIG. 13-1 can be prevented (FIG. 13-2).

FIG. 11-3 shows a practical example. As shown in the diagram, to execute the filtering process on (1, 1), it is necessary to use the texture data of x=512 or y=512. Therefore, all of the texture data are first stored into the RAM 113 and some of the texture data which are necessary to the filtering process are input to the CPU 108 and calculated on the basis of the address calculations mentioned above. That is, when the images each having the size of 512 dots × 512 dots are arranged, the calculation is executed with respect to the adjacent pixels at the edges of the image patterns.

The operation which is executed in the circuit of FIG. 9-1 will be described with reference to a flowchart for the CPU 108 in FIG. 10-2. The texture pattern data which was set through the selector 202 is now stored in the RAM 113. First, the first block data of 3×3 pixels (FIG. 12-2) is read out of the RAM 113 and is input to the CPU 108 through the drivers 204 and 206 (S-500). The calculation is executed in accordance with the smoothing calculating equation shown in FIG. 12-2 (S-501). The result of the calculation is written as a value of a central pixel e into the RAM 113 through the driver 205, selector 202, and driver 203 (S-502). In the address control of the RAM 113 in such a case, an address control signal of the CPU 108 on the A side of the selector 210 is used. The above calculation is sequentially executed (S-503) with respect to the hatched area in FIG. 12-1, which will be explained later, that is, the peripheral area of the texture pattern.

In the above example, the smoothing calculation has been performed for every pixel (refer to S-503). However, it is also possible to construct the device such that all of the data in the RAM 113 are read out and input to the CPU 08 and the calculations are executed in a lump and the results of the calculations are sequentially written into the RAM 113. On the other hand, as shown in FIG. 9-2, it is also possible to construct it in a manner such that a smoothing circuit 600 to execute the smoothing calculation as shown in FIG. 12-2 is provided for the hardware construction and the enable control is performed by the CPU 108 so as to execute the smoothing process with respect to a predetermined area.

Figure 4B:
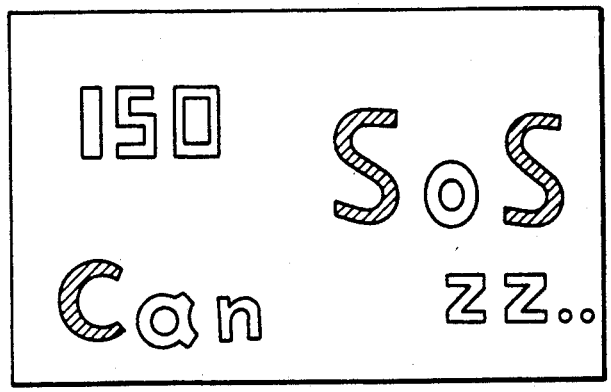

The filtering process is executed on the area near the outer frame of the texture pattern as shown in FIG. 12-1. The filtering process is performed on only the portion in a range from the pixel of the outermost position to the pixel which is inside therefrom by only a proper number of pixels. If the width of such portion is narrowed, the effect decreases. However, if the width is set to be too wide, the effect of the texture process is reduced. The width corresponding to the number of pixels can be set to be large or small by the operation unit 105. The CPU 108 changes the size of area which is subjected to the smoothing process in accordance with the setting of such a width by the operation unit 105. FIG. 12-4 shows the result in the case where the area near the outer frame of the pattern shown in FIG. 12-3 has been subjected to the filtering process. FIGS. 13-1 and 13-2 show the patterns in which the areas subjected to the filtering process are repetitively arranged. Although the drawings relate to the case where the pattern has been repeated only in the lateral direction, the effect similar to the case of the lateral direction can be also obtained with regard to the vertical direction.

On the other hand, if the operation command is a copy start command (S-401), a check is made to see if the texture process has been selected or not. If the texture process has been selected (S-412), the image modulator 114 is made operative. If the texture process is not selected (S-413), the operating mode of the image modulator 114 is s t to the image through mode and the ordinary original reading operation is executed (S-416).

In this embodiment, the matrix of size $3 \times 3$ has been used to execute the filtering process. However, the matrix size is not limited to $3 \times 3$. A matrix of size $5 \times 5$, $7 \times 7$, or the like can be also used.

The width of the area which is subjected to the filtering process, that is, the width of the hatched area of FIG. 12-1 can be properly determined in accordance with a degree of a desired filtering effect. On the other hand, it is also possible to execute the filtering process in only the vertical or the lateral direction.

Further, the kind of filter is not limited to the average in the matrix but can be also set to the maximum value (FIG. 8), minimum value, or the like in the matrix.

As mentioned above, according to the embodiment, as the result of that a sample image for the texture process was repetitively arranged, if the joint surfaces of the sample images become unnatural, by executing the filtering process on the outside frame portion of the sample image, a situation such that the process unnaturally changes at the joint surfaces can be avoided. Even in the case where the memory size of the sample image is relatively small, the natural texture effect can be also derived.

As described above, according to this embodiment, by providing, inputting means (CCD 100 or the like) for inputting first image data, memory means (RAM 113) for storing the first image data, means (image modulator 114) for executing the filtering process to the first image data, and means (image modulator 114) for modulating a concentration of the second image data by an output from the means for executing the filtering process, the generation of the lines of the concentration difference due to a sudden change in concentration when the concentration modulation is executed on the image data can be prevented.

The above embodiment has been described with respect to the filtering process in the case of executing the texture process by using a repetitive pattern. However, even in the case of using the repetitive pattern, when the texture process is executed to a part of the original image, an effect such that the boundary with the non-processing portion becomes smooth can be obtained.

(Embodiment 4)

In a manner similar to embodiment 3, embodiment 4 also is intended to prevent the concentration different lines which are generated when a texture pattern is repeated. In the embodiment, such an object is accomplished by the folding-back process of the data in the texture pattern memory 113.

A whole construction of the fourth embodiment of the invention is similar to FIG. 1. In addition, since the circuits to execute the texture process are also substantially similar to those in FIG. 3, their descriptions are omitted.

Figure 15:
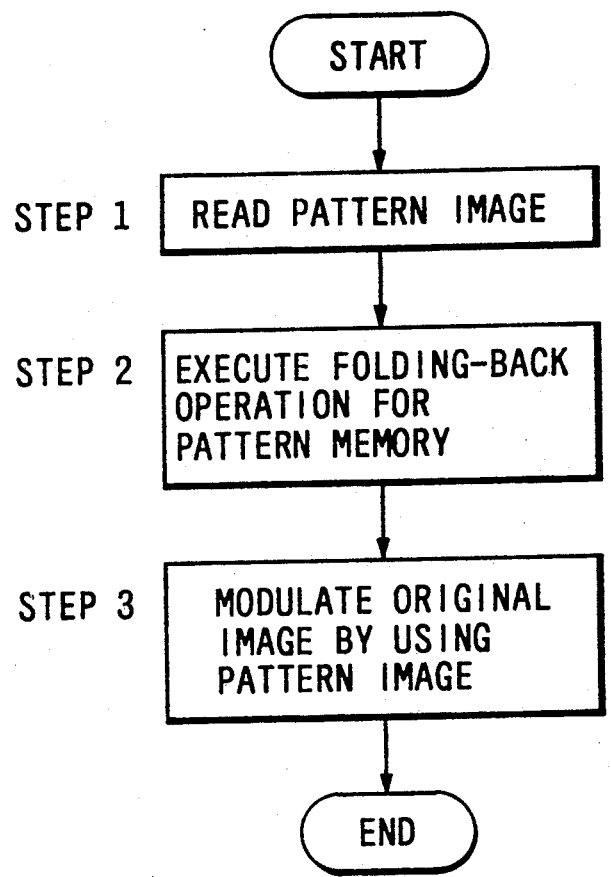
FIG. 15 is a diagram showing an algorithm of the fourth embodiment of the invention.

FIG. 15 is a diagram for explaining an algorithm of the embodiment.

In step 1, a concentration pattern (texture pattern) of an original put on an original base is read. The reading operation is similar to that in the case of the first embodiment.

In step 2, a folding-back operation, which will be explained later, is executed on contents of the memory into which the read pattern was stored. A pattern which is point symmetrical with respect the center of the memory as an origin is formed. FIGS. 17A to 17C, 18A, and 18B are diagrams for explaining a practical example.

Assuming that the pattern memory size is set to n x m, first, the following substitution is executed (FIG. 18A), $$P(x, y) \rightarrow P(n+1-x, y)$$

where, $x = 1$ to $n/2$, $y = 1$ to $m/2$

Figure 17A:
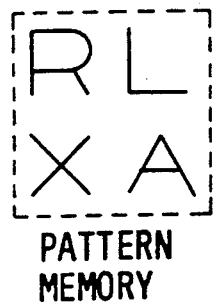
FIGS. 17A to 17C are diagrams for explaining a practical example of the texture process in the embodiment.
Figure 17B:
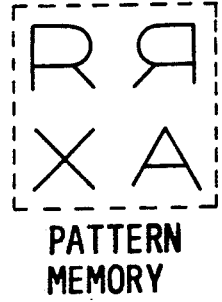

Thus, the content of the pattern memory becomes as shown in FIG. 17B.

Next, the following substitution is performed (FIG. 18B), $$P(x, y) \rightarrow P(x, m+1-y)$$

where, x=1 to n, y=1 to m/2

Figure 17C:
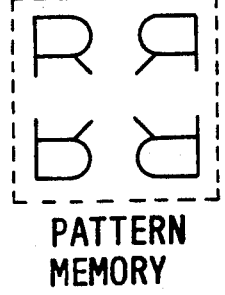
Figure 18A:
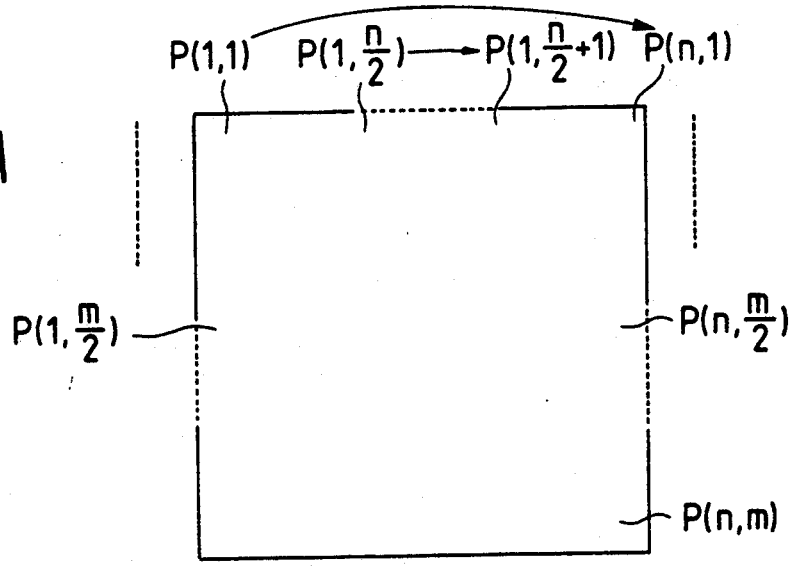
FIGS. 18A and 18B are diagrams showing states of a pattern memory in the fourth embodiment of the invention.
Figure 18B:
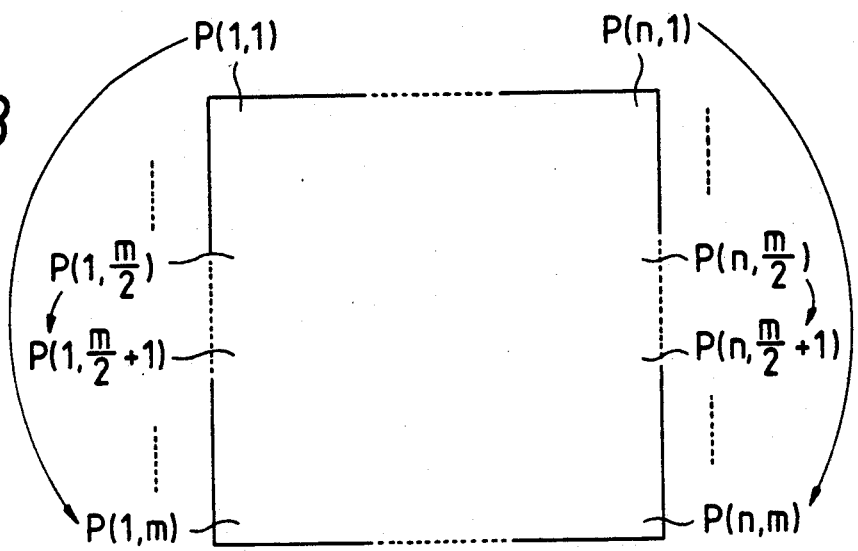

Thus, the content of the pattern memory becomes as shown in FIG. 17C. A pattern which is point symmetrical with respect to the center of the memory as an origin is produced. The above process is executed in accordance with a procedure of the program of the CPU 108. The operation of the texture processing circuit (FIG. 2) is similar to the case of the embodiment 3.

In step 3, the texture process is executed by the pattern produced.

In the pattern produced, the concentrations of the left, right, upper, and lower edges are equally repeated. Even if the patterns are arranged in the upper, lower, right, and left positions, no concentration variation occurs at the boundaries.

Therefore, if the texture process is executed by using the produced pattern, even if a texture pattern of a limit size is used, the texture process such as not to cause any concentration different line at the boundaries is executed and a good image pattern can be output.

Figure 16A:
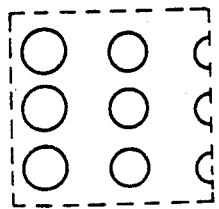
FIGS. 16A to 16C are diagrams for explaining a problem in the conventional texture process.
Figure 16B:
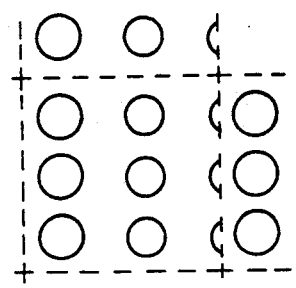
Figure 16C:
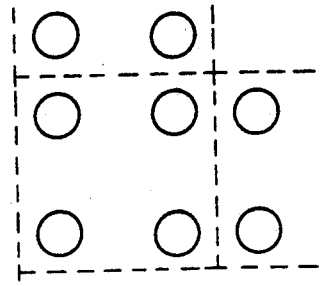

That is, for instance, if the texture pattern as shown in FIG. 16A is read, the texture process is executed by the pattern as shown in FIG. 16C.

In this embodiment, a point symmetrical pattern has been used as a pattern for the concentration modulation. However, by executing the similar process, a line symmetrical pattern is generated and the concentration modulation can be also executed on the basis of the line symmetrical pattern. In this case, it is possible to execute the texture process having no concentration different line with respect to at least either the vertical or lateral direction.

(Embodiment 5).

Embodiment 5 relates to the case where when a texture pattern is read, that is, when the concentration modulation is executed, a pattern which is point symmetrical with respect to the center of the pattern as an origin is read out.

Figure 19:
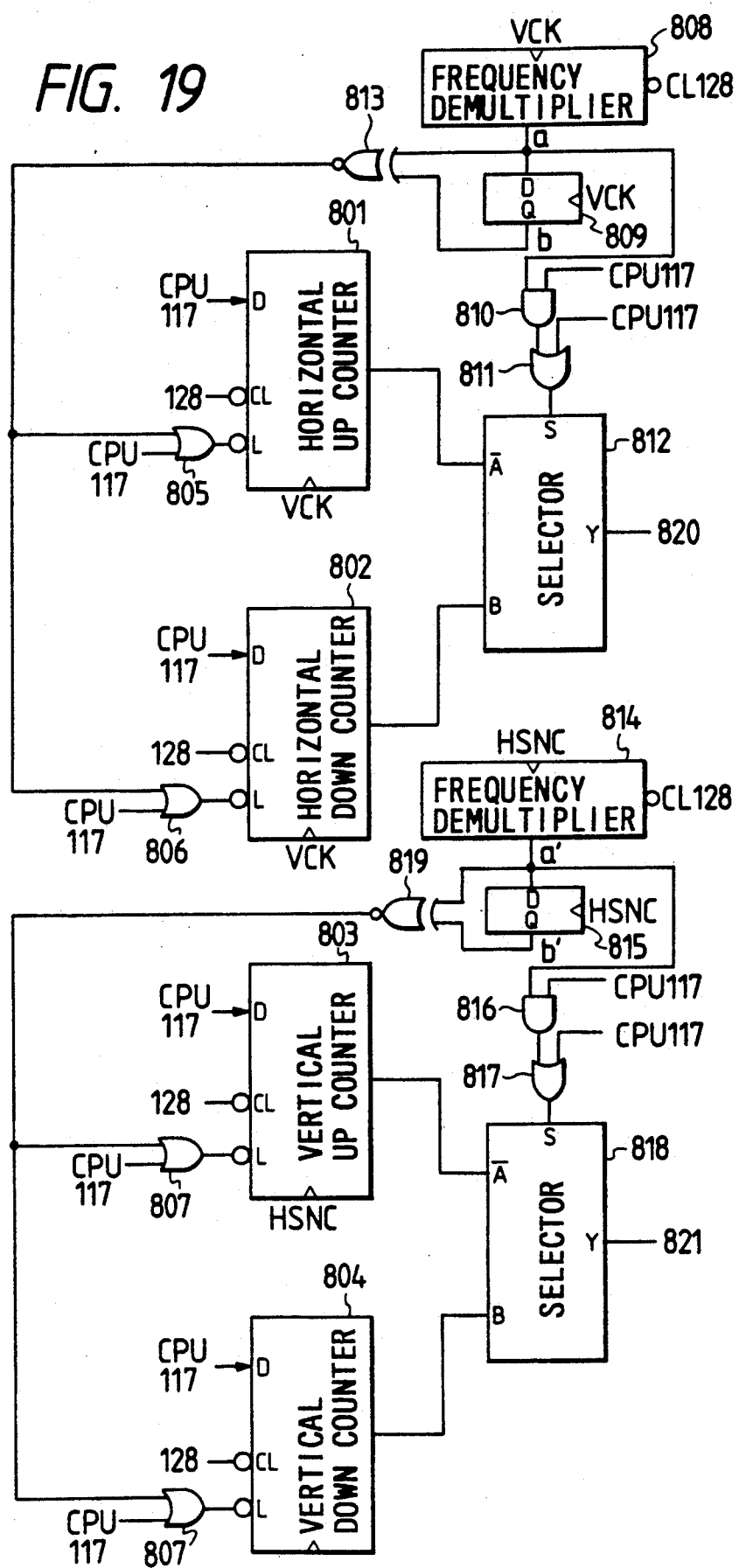
FIG. 19 is a block diagram of the fifth embodiment of the invention.

The fundamental system of embodiment 5 is substantially the same as the fourth embodiment and can be realized by replacing the horizontal counter 211 and vertical counter 212 in FIG. 3 with counters shown in FIG. 19.

The system of FIG. 19 comprises: a horizontal up counter 801; a horizontal down counter 802; a vertical up counter 803; a vertical down counter 804; OR gates 805, 806, 807, 811, and 817; AND gates 810 and 816; EXOR gates 813 and 819; frequency demultipliers 808 and 814; D flip-flops (D F/F) 809 and 815; and selectors 812 and 818.

Since horizontal and vertical counters have substantially the same construction except that the clocks are different, explanation will now be made by using the horizontal counters hereinafter.

Figure 20:
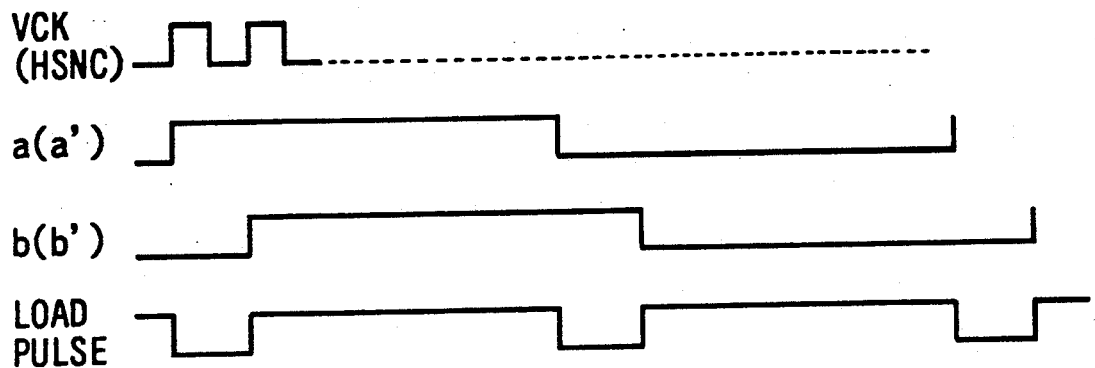
FIG. 20 is a diagram showing pulses for the texture process according to the fifth embodiment of the invention.

Assuming that the texture pattern has a size of n×m, first, when the address of the up counter is equal to or larger than the length of ½ of the pattern size (until n/2 in the horizontal direction), a waveform is formed by the frequency demultiplier so as to select the address of the down counter by a selector (a (a') in FIG. 20). At the changing point of the selection of the counter, the values set by the CPU 108 are loaded into the counters, respectively, (load pulse in FIG. 20). Practically speaking, $\phi$ is loaded into the horizontal up counter 801 and n/2 is loaded into the horizontal down counter 802.

Figure 21:
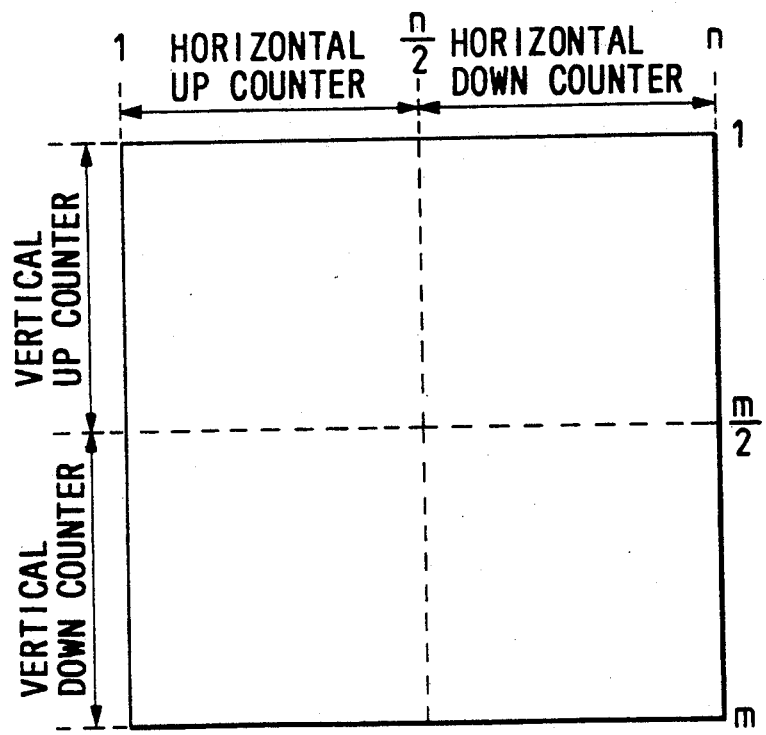
FIG. 21 is a diagram showing counters which are used in the texture process in the fifth embodiment of the invention.

FIG. 21 is a diagram showing the case where the above operation is applied in the horizontal and vertical directions. Due to this, even if the pattern of FIG. 17A is the read pattern, a pattern as shown in FIG. 17C can be read out.

When the pattern is read, by using $\phi$ as a register value which is set into the gates 810, 811, 816, and 817, the horizontal up counter and the vertical up counter are selected, so that the ordinary pattern is read.

As described above, by generating a pattern which is point symmetrical with respect to the center of a texture pattern of a limited size, it is possible to provide a cheap image processing apparatus of a high performance which can reduce the concentration diffferent line of the boundary portions which are generated in the case of executing the texture process to an area larger than the size of the pattern memory by using the pattern memory of the limited size.

(Embodiment 6)

In the above embodiments 1 to 5, the concentration modulation has been executed on multivalue color image data by using the multivalue single color concentration data. However, in the sixth embodiment, the concentration modulation is executed by using the multivalue color image data.

Figure 22:
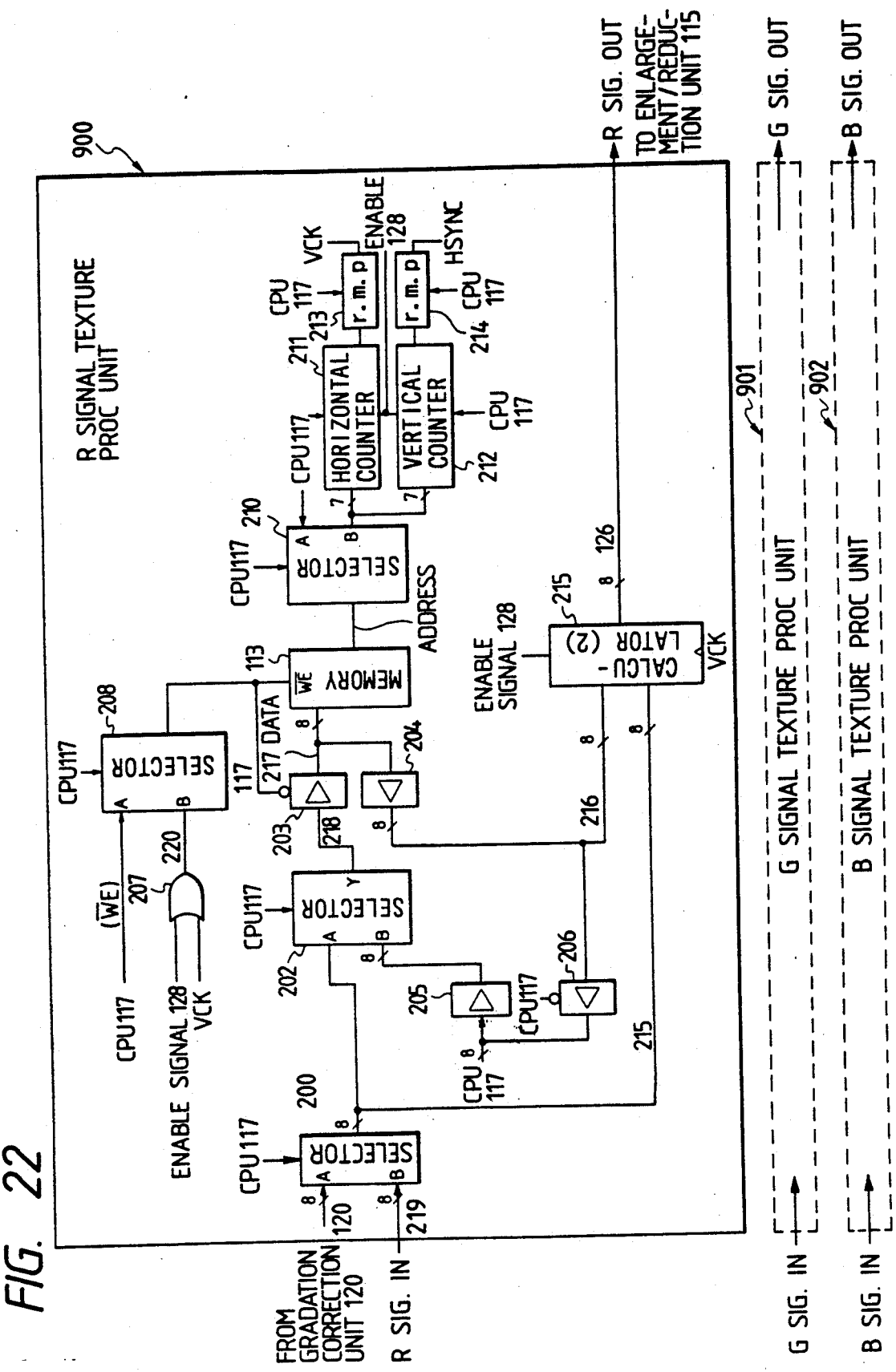
FIG. 22 is a diagram showing the sixth embodiment of the invention.

Therefore, as shown in FIG. 22, in the sixth embodiment, the texture processing unit in FIG. 2, from which the calculator (1) to execute the mean value process of each color component is omitted, is provided for each color component of R, G, and B (900, 901, 902), thereby enabling the texture process to be executed for every color component. Each of the texture processing units 900 to 902 has a construction similar to that FIG. 2. The address signal of the memory and the enable signal can be commonly used for the R, G, and B signals. In such a case, the counters and the like can be commonly used.

This embodiment can be also applied to embodiments 1 to 5. According to embodiment 6, since the mutual calculations among the multivalue color image data are executed, the effect of the texture process becomes typical.

A printer which can output a color image such as a color laser printer, color ink jet printer, color dot printer, color thermal copy transfer printer, color printer using a recording material responsive to three primary colors of light, etc. can be used as a printer unit 116 which is used in the invention.

In these embodiments, the construction of the texture process for executing the concentration modulation to the color image input in a real-time manner has been shown. However, a white and black image may be also used as an image which is subjected to the texture process.

In the above embodiments, both of the texture pattern and the image to be texture processed use multivalue data. However, either one or both of them can use binary data.

Various kinds of arithmetic operating circuits such as adders, AND circuits, OR circuits etc. can be also used in place of the multipliers.

Also, the method of forming the pattern data is not limited to (R+G+B)/3. That is, the pattern data can be formed on the basis of the maximum or minimum value among the R, G, and B signals.

Image inputting means is not limited to the CCD but, for instance, external inputting means such as still video camera, video camera, or the like can be also used.

The memory to store the pattern data is not limited to the RAM but memory means such as a magnetic disk or the like can be also used.

The present invention is not limited to the foregoing embodiments but many modifications and variations are possible within the spirit and scope of the appended claims of the invention.

What is claimed is:

1. An image processing apparatus comprising:
   inputting means for inputting image data;
   memory means for storing first image data which is input by said inputting means;
   area designating means for designating an area; and
   processing means for executing a modulating process on said area of second image data which is input by said inputting means, by using the first image data stored in said memory means.

2. An apparatus according to claim 1, wherein said area is a non-rectangular area.

3. An apparatus according to claim 1, further comprising means for detecting a predetermined color of said second image data,
   and wherein said area is specified by the color detected by said detecting means.

4. An apparatus according to claim 1, wherein said inputting means includes a charge-coupled device (CCD) for reading an original and generating color component signals of R (red), G (green), and B (blue).

5. An apparatus according to claim 1, wherein said memory means is a random access memory (RAM).

6. An appratus according to claim 1, wherein said processing means includes modulating means for multiplying the first image data stored in the memory means by the second image data.

7. An apparatus according to claim 1, wherein said first image data is concentration data.

8. An apparatus according to claim 1, further comprising variably magnifying means for variably magnifying the first image data.

9. An apparatus according to claim 8, wherein said variably magnifying means executes a variable magnification by using address control of said memory means by a counter.

10. An apparatus according to claim 1, further comprising means for selecting said inputting means for inputting the first image data.

11. An apparatus according to claim 10, wherein said inputting means for inputting the first image data is either image reading means including a charge-coupled device (CCD) or a central processing unit (CPU).

12. An apparatus according to claim 10, wherein either one of address control signals of said plurality of memory means is selected in accordance with the selection by said selecting means.

13. An apparatus according to claim 12, wherein said address control signal is either an address control signal which is generated on the basis of a counter output or an address control signal of a central processing unit (CPU).

14. An image processing apparatus comprising:
    inputting means for inputting image data;
    memory means for storing first image data which is input by said inputting means; and
    processing means for variably magnifying the first image data stored in said memory means and modulating a concentration of second image data which is input by said inputting means.

15. An apparatus according to claim 14, wherein said processing means variably magnifies the first image data by address control of said memory means by a counter.

16. An apparatus according to claim 14, further comprising area designating means for designating at least one area to be modulation processed in the second image data.

17. An apparatus according to claim 16, wherein said area is a non-rectangular area.

18. An apparatus according to claim 16, further comprising means for detecting a predetermined color of said second image data,
    and wherein said area is specified by the color detected by said detecting means.

19. An apparatus according to claim 14, wherein said inputting means includes a charge-coupled device (CCD) for reading an original and generating color component signals of R (red), G (green), and B (blue).

20. An apparatus according to claim 14, wherein said memory means is a random access memory (RAM).

21. An apparatus according to claim 14, wherein said processing means includes modulating means for multiplying the first image data stored in the memory means by the second image data.

22. An apparatus according to claim 14, further comprising means for selecting said inputting means for inputting the first image data.

23. An apparatus according to claim 22, wherein the inputting means for inputting the first image data is either image reading means including a charge-coupled device (CCD) or a central processing unit (CPU).

24. An apparatus according to claim 22, wherein either one of address control signals of said plurality of memory means is selected in accordance with the selection by said selecting means.

25. An apparatus according to claim 24, wherein said address control signal is either an address control signal which is generated on the basis of a counter output or an address control signal of a central processing unit (CPU).

26. An apparatus according to claim 14, wherein said first image data is concentration data.

27. An image processing apparatus comprising:
    inputting means for inputting image data;
    memory means for storing first image data input by said inputting means;
    filtering processing means for executing a filtering process on the first image data; and
    modulating means for modulating second image data input by said inputting means by using an output of said filtering processing means.

28. An apparatus according to claim 27, wherein said filtering process is executed by a convolution arithmetic operation.

29. An apparatus according to claim 27, wherein said filtering process is a smoothing process.

30. An apparatus according to claim 27, further comprising means for changing an area which is subjected to the filtering process.

31. An image processing apparatus comprising:
    inputting means for inputting image data;
    memory means for storing first image data input by said inputting means;
    modulating means for modulating second image data input by said inputting means by repetitively using the first image data; and processing means for eliminating discontinuity in a boundary portion of the first image data.

32. An apparatus according to claim 31, wherein said processing means eliminates said discontinuity by executing a filtering process in said boundary portion.

33. An apparatus according to claim 32, wherein said filtering process is a smoothing process.

34. An apparatus according to claim 31, wherein said processing means sets an image which is expressed by the first image data to be point symmetrical with respect to the center of the image.

35. An apparatus according to claim 34, wherein said processing means includes a plurality of counters to execute a process for setting the image to be point symmetrical.

36. An image processing apparatus comprising:
inputting means for inputting a plurality of color component signals;
memory means for storing multivalue concentration data which is obtained on the basis of the color component signals input by said inputting means; and
calculating means for executing a calculation by using the color component signals input by said inputting means and the concentration data stored in said memory means.

37. An apparatus according to claim 36, wherein said inputting means includes a charge-coupled device line sensor (CCD line sensor) for inputting the plurality of color component signals for every pixel.

38. An apparatus according to claim 36, wherein said multivalue concentration data is a mean value of the color component signals input by said inputting means.

39. An apparatus according to claim 36, wherein said calculating means multiplies the multivalue concentration data by each of the color component signals.

40. A still-image processing method comprising the steps of:
storing first image data;
inputting second image data; and
sequentially mutually calculating the first and second image data for every pixel while reading out the first image data for every pixel.

41. A method according to claim 40, wherein said storing step includes the step of extracting concentration data of a single color from the plurality of color component signals.

42. A method according to claim 40, wherein in said calculating step, a multiplication of said first and second image data is executed.

43. A method according to claim 40, wherein said first image data is multivalue image data.

44. A method according to claim 40, further comprising the step of:
designating an area in an image which is expressed by said second image data,
and wherein in said calculating step, said mutual calculation is executed with respect to only the area designated in said area designating step.

45. A method according to claim 40, wherein said inputting step includes the step of scanning an original by a CCD line sensor and generating a plurality of color component signals.

46. A method according to claim 44, wherein each of said plurality of color component signals is multivalue data.

47. A still image processing apparatus comprising:
inputting means for inputting image data;
memory means for storing first image data which is input by said inputting means, the first image data representing a first image having a predetermined area; and
processing means for executing a modulating processing on second image data which is input by said inputting means, by using the first image data, stored in said memory means.

48. An apparatus according to claim 47, further comprising detecting means for detecting a predetermined color of the second image data, and wherein the predetermined area is specified by the color detected by said detecting means.

49. An apparatus according to claim 47, wherein said inputting means includes a charge-coupled device for reading an original and generating color component signals representing R (red), G (green) and B blue) color components.

50. An apparatus according to claim 47, wherein said processing means includes monitoring means for multiplying the first image data stored in said memory means by the second image data.

51. An apparatus according to claim 47, wherein said inputting means for inputting the first image data is selected from the group consisting of (1) image reading means including a charge-coupled device and (2) a central processing unit.

52. An apparatus according to claim 47, further comprising variable-magnifying means for variably magnifying the first image data.

53. An image processing apparatus comprising:
correcting means for performing color correction of color image data;
generating means for generating multivalue image data; and
modulating means for modulating the color image data corrected by said correcting means, by using the multivalue image data.

54. An apparatus according to claim 53, wherein said correcting means performs color masking.

55. An apparatus according to claim 53, wherein said correcting means performs undercolor removal.

56. An apparatus according to claim 53, wherein said correcting means performs gradation correction.

57. An apparatus according to claim 53, further comprising inputting means for inputting the color image data.

58. An apparatus according to claim 53, further comprising image forming means for forming an image on a recording medium in accordance with the color image data modulated by said modulating means.

59. An image processing apparatus comprising:
processing means for performing undercolor removal processing on color image data;
generating means for generating multivalue image data; and
modulating means for modulating the color image data which has been undercolor-removal processed, by using the multivalue image data.

60. An apparatus according to claim 59, further comprising inputting means for inputting the color image data.

61. An apparatus according to claim 59, further comprising image forming means for forming an image on a recording medium in accordance with the color image data modulated by said modulating means.

62. A still-image processing method comprising the steps of:

selecting an image processing mode;
reading multivalue image data stored in a memory;
inputting color image data; and
modulating the color image data by using the multivalue image data.

63. A method according to claim 62, wherein the image processing mode is a texture mode and is selected by an operation unit.

64. A method according to claim 62, wherein said reading step and said inputting step are started in response to a single operation command.

65. A method according to claim 62, wherein, in said modulating step, calculations selected from the group consisting of multiplication and addition are performed.

66. An image copying apparatus comprising:
generating means for generating first image data;
reading means for reading an original image to generate second image data;
processing means for modulating the second image data, by using the first image data generated by said generating means; and
image forming means for forming an image on a recording medium using the second image data which has been modulated by said processing means.

67. An apparatus according to claim 66, wherein said reading means further comprises a charge-coupled device.

68. An apparatus according to claim 66, wherein said processing means further comprises modulating means for multiplying the first image data generated by said generating means by the second image data.

69. An apparatus according to claim 66, wherein said image forming means comprises a laser beam printer.

70. An apparatus according to claim 66, further comprising variable-magnifying means for variably magnifying the first image data.

71. An apparatus according to claim 66, further comprising designating means for designating an area, and wherein said processing means modulates the second image data of the area designated by said designating means.

72. An apparatus according to claim 66, wherein said generating means further comprises memory means.

73. An apparatus according to claim 72, wherein said memory means stores therein the first image data based on the image data read by said reading means.

* * * * *

UNITED STATES PATENT AND TRADEMARK OFFICE
CERTIFICATE OF CORRECTION

PATENT NO. : 5,021,876
DATED : June 4, 1991
INVENTOR(S) : MITSURU KURITA, ET AL.

Page 1 of 3

It is certified that error appears in the above-identified patent and that said Letters Patent is hereby corrected as shown below:

COLUMN 1

Line 52, "in" should read --stored in--.

COLUMN 2

Line 43, "aspect of the present" should be deleted.
    Line 44, "third" should read --third aspect of the present--.
    Line 46, "to" should read --on--.

COLUMN 3

Line 13, "an" should read --a--.
    Line 59, "portion" should read --portion,--.

COLUMN 4

Line 4, "on" should read --to--.
    Line 5, "to" should read --on--.
    Line 8, "from" should read --from another--.
    Line 22, "designation" should read --generation--.
    Line 36, "lines         " should read --lines $\overline{\small[\_\_\_\_]}$ --.

COLUMN 5

Line 48, "area       " should read --area $\overline{\small[\_\_\_\_]}$ --.
    Line 49, "of   to   is" should read --of ① to ③ is--.
    Line 55, "the" should be deleted.
    Line 61, "data 221" should read --data--.

UNITED STATES PATENT AND TRADEMARK OFFICE
CERTIFICATE OF CORRECTION

PATENT NO. : 5,021,876
DATED : June 4, 1991
INVENTOR(S) : MITSURU KURITA, ET AL.

It is certified that error appears in the above-identified patent and that said Letters Patent is hereby corrected as shown below:

COLUMN 6

Line 50, "r.m.p." should read --r.m.p.'s--.

COLUMN 8

Line 12, "an other" should read --another--.
    Line 26, "of" (second occurrence) should read --of size--.
    Line 38, "respectively," should read --respectively:--.

COLUMN 9

Line 18, "CPU 08" should read --CPU 108--.
    Line 30, "on only" should read --only on--.
    Line 44, Close up right margin.
    Line 45, "10" should be deleted and close up left margin.
    Line 57, "s t" should read --set--.

COLUMN 10

Line 4, "the" should read --this--.
    Line 5, "that" should be deleted.
    Line 6, "was" should read --being--.
    Line 15, "providing," should read --providing--.
    Line 39, "concentration" should read --concentration of--.
    Line 62, "(Fig. 18A)," should read --Fig. 18A):--.

UNITED STATES PATENT AND TRADEMARK OFFICE
CERTIFICATE OF CORRECTION

PATENT NO. : 5,021,876
DATED : June 4, 1991
INVENTOR(S) : MITSURU KURITA, ET AL.

Page 3 of 3

It is certified that error appears in the above-identified patent and that said Letters Patent is hereby corrected as shown below:

COLUMN 11

Line 2, "18B)," should read --18B):--.
Line 52, "807," should read --807, 807'--.

COLUMN 16

Line 17, "blue)" should read --(blue)--.

Signed and Sealed this

Ninth Day of February, 1993

Attest:

STEPHEN G. KUNIN

Attesting Officer

Acting Commissioner of Patents and Trademarks